(12) United States Patent
Kobayashi et al.

(10) Patent No.: US 6,781,595 B2
(45) Date of Patent: Aug. 24, 2004

(54) IMAGE PROCESSING APPARATUS AND METHOD, AND RECORDING MEDIUM THEREFOR

(75) Inventors: Seiji Kobayashi, Tokyo (JP); Tomoo Mitsunaga, Kanagawa (JP); Hiroaki Ono, Saitama (JP); Ken Nakajima, Tokyo (JP); Chikako Sano, Kanagawa (JP); Nobuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 10/035,711

(22) Filed: Oct. 22, 2001

(65) Prior Publication Data

US 2002/0171663 A1 Nov. 21, 2002

(30) Foreign Application Priority Data

Oct. 23, 2000 (JP) ..................................... P2000-322228
Jan. 24, 2001 (JP) ..................................... P2001-016084

(51) Int. Cl.[7] .................................................. G09G 5/02
(52) U.S. Cl. ....................... 345/589; 345/597; 345/600; 345/601; 345/274
(58) Field of Search ................................ 345/589, 597, 345/600, 601, 274

(56) References Cited

U.S. PATENT DOCUMENTS 5,048,110 A * 9/1991 Nakajima .................... 382/130
5,886,797 A * 3/1999 Shimura ...................... 358/455

* cited by examiner

Primary Examiner—Matthew C. Bella
Assistant Examiner—Tam Tran
(74) Attorney, Agent, or Firm—Bell, Boyd & Lloyd LLC

(57) ABSTRACT

An image processing apparatus and method and a recording medium therefor control the occurrence of a change in a hue. The histogram of a luminance signal Y is generated in a first step S1. In a second step S2, the histograms of the luminance signals Y are accumulated to generate a cumulative histogram, and the cumulative histogram is subjected to logarithmic approximation thereby to generate a lookup table (LUT) for correcting luminance signals. In a third step S3, a color-difference signal correction parameter LUT is generated by referring to the LUT for correcting luminance signals. In a fourth step S4, an input luminance signal Y is applied to the LUT for correcting luminance signals thereby to acquire a corrected luminance signal $Y_0$. In a fifth step S5, the input luminance signal Y is applied to a color-difference signal correction parameter LUT so as to acquire a correction parameter k. In a sixth step S6, input color-difference signals Cr and Cb are multiplied by the correction parameter k to acquire corrected color-difference signals $Cr_0$ and $Cb_0$.

27 Claims, 14 Drawing Sheets

FIG. 7A

| R | G |
|---|---|
| G | B |

FIG. 7B

| Ye | G |
|----|---|
| G  | Cy |

FIG. 7C

| Ye | Cy |
|----|----|
| G  | Mg |

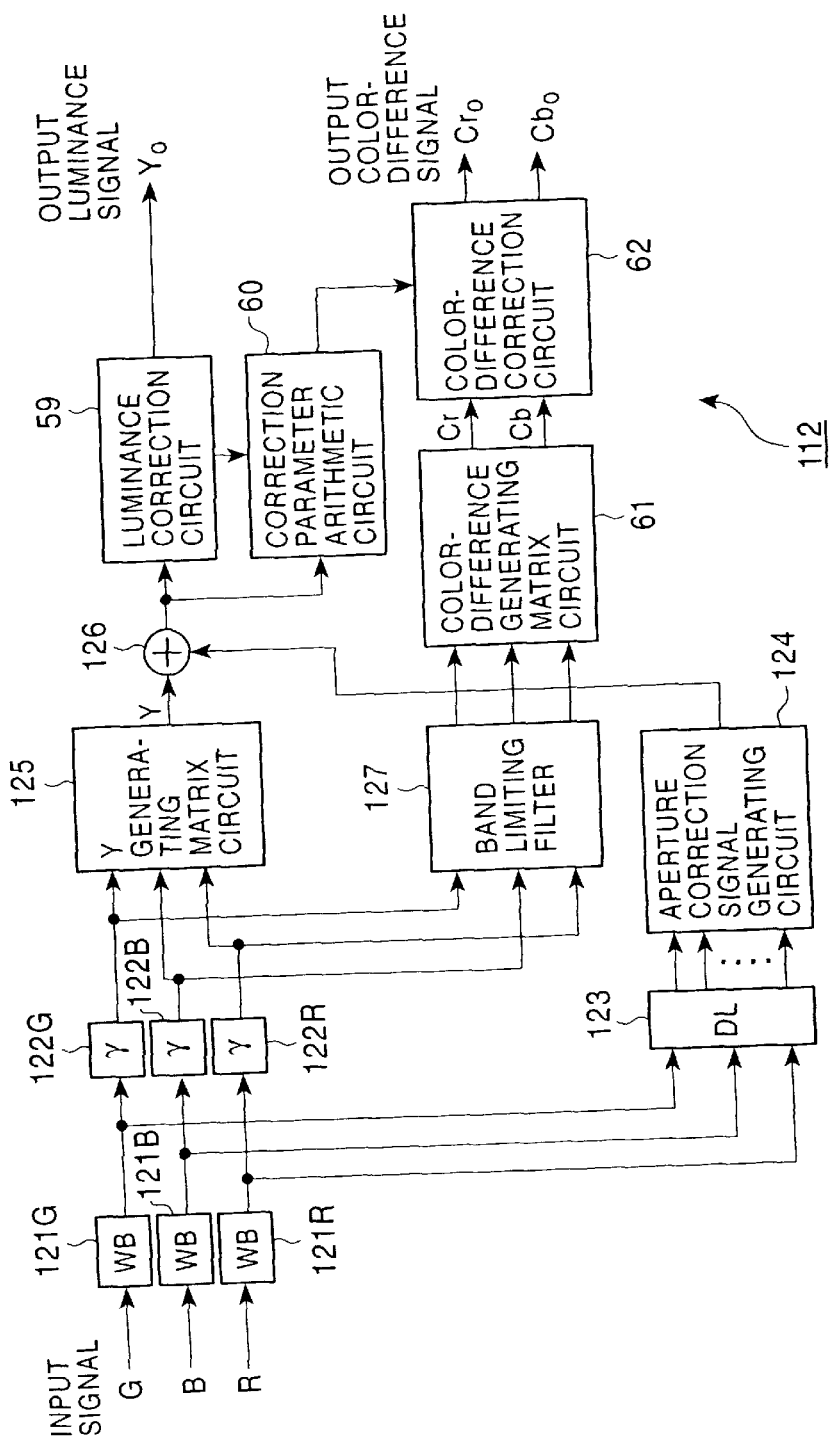

IMAGE PROCESSING APPARATUS AND METHOD, AND RECORDING MEDIUM THEREFOR

BACKGROUND OF THE INVENTION

1. Field of the Invention

The present invention relates to an image processing apparatus and a method and a recording medium therefor. More particularly, the image processing apparatus and method and a recording medium of the present invention are ideally adapted for correcting the gray level of an image according to the dynamic range of an image output apparatus, such as a display or a printer.

2. Description of the Related Art

Recent developments in image signal acquiring equipment incorporating a solid-state image sensing device or a charge-coupled device (CCD), such as a digital camera or a scanner, have led to the improved performance of the solid-state image sensing device, permitting multi-stage exposures. This has made it possible to acquire image signals in a wider gray level dynamic range (hereinafter referred to as "the wide dynamic range image signals").

Meanwhile, the recording formats of media for recording image signals, the formats of signals output to displays or printers, broadcast signal formats, and the like are still limited to the conventional dynamic ranges of 8-bit width or 10-bit width (hereinafter referred to as "the narrow dynamic range").

Accordingly, to output image signals from electronic equipment capable of acquiring image signals of a wide dynamic range to other electronic equipment of the conventional narrow dynamic range, it is necessary to correct the gray levels of the image signals of the wide dynamic range, that is, to narrow the dynamic range.

Japanese Unexamined Patent Application Publication No. 9-331539 discloses a technique for correcting the dynamic range of image signals by individually correcting the gray levels of the signals of the three primary colors, Red, Green, and Blue (R, G, and B,) in a broadcasting video camera. FIG. 1 illustrates an example of the configuration of a gray level correction processor in such a broadcasting video camera. In the gray level correction processor, the three primary color signals R, G, and B are supplied to a correction parameter arithmetic circuit 1, and also to their corresponding gray level correction circuits 2R, 2G, and 2B, respectively.

The correction parameter arithmetic circuit 1 uses the received three primary color signals R, G, and B to generate luminance signals, and computes correction parameters on the basis of the luminance signals, then outputs the computed correction parameters to the gray level correction circuits 2R, 2G, and 2B.

The gray level correction circuit 2R includes a lookup table (hereinafter referred to as "LUT") for correcting the gray level of a red signal R. The circuit 2R checks the correction parameter and the red signal R, which have been received from the correction parameter arithmetic circuit 1, against the built-in LUT, and outputs the associated value to a gamma correction circuit 3 as a correction value. The gray level correction circuit 2G includes a LUT for correcting the gray level of a green signal G. The circuit 2G checks the correction parameter and the green signal G, which have been received from the correction parameter arithmetic circuit 1, against the built-in LUT, and outputs the associated value to the gamma correction circuit 3 as a correction value.

The gray level correction circuit 2B includes a LUT for correcting the gray level of a blue signal B. The circuit 2B checks the correction parameter and the blue signal B, which have been received from the correction parameter arithmetic circuit 1, against the built-in LUT, and outputs the associated value to the gamma correction circuit 3 as a correction value.

A gamma correction circuit 3R carries out a gamma correction on the corrected red signal R received from the gray level correction circuit 2R, and outputs the result to a matrix circuit 4. A gamma correction circuit 3G carries out a gamma correction on the corrected green signal G received from the gray level correction circuit 2G, and outputs the result to the matrix circuit 4. A gamma correction circuit 3B carries out a gamma correction on the corrected blue signal B received from the gray level correction circuit 2B, and outputs the result to the matrix circuit 4. The matrix circuit 4 coverts the gamma-corrected three primary color signals R, G, and B into a luminance signal $Y_0$ and color-difference signals $Cr_0$ and $Cb_0$.

The gray level correction processor shown in FIG. 1 performs the gray level correction on the three primary color signals R, G, and B, respectively, at the same ratio. Hence, it is possible to compress the dynamic range of image signals to a desired width without causing a change in hue.

The gray level correction processor, however, requires the gray level correction circuits 2 and the gamma correction circuits 3 for the three primary color signals R, G, and B, respectively. This leads to a problem in that using the gray level correction processor in a consumer appliance, such as a digital camera, a video camera, or a television receiver, inevitably results in higher cost and a greater circuit scale.

Japanese Unexamined Patent Application Publication No. 11-55598 has disclosed a technique for correcting the dynamic range of image signals by performing gray level corrections only on the luminance signal Y among the image signals in a television receiver. FIG. 2 illustrates an example of the configuration of a gray level correction processor for such a television receiver.

In the gray level correction processor, a received luminance signal Y is supplied to a correction parameter arithmetic circuit 11, a luminance correction circuit 12, and a color-difference correction circuit 13, while received color-difference signals Cr and Cb are supplied to the color-difference correction circuit 13.

Based on a received luminance signal Y, the correction parameter arithmetic circuit 11 computes a correction parameter with which an optimum gray level correction will be made in the luminance correction circuit 12, and outputs the computed correction parameter to the luminance correction circuit 12. The luminance correction circuit 12, which includes a LUT for correcting the gray level of the luminance signal Y, checks the correction parameter and the luminance signal Y received from the correction parameter arithmetic circuit 11 against the built-in LUT, and outputs an associated value as a correction value $Y_0$. The correction value $Y_0$ is also supplied to the color-difference correction circuit 13.

The color-difference correction circuit 13 performs normalization by multiplying the color-difference signals Cr and Cb by $Y_0/Y$, which is a ratio of the luminance signal Y before gray level correction to the luminance signal $Y_0$ after the correction, and generates color-difference signals $Cr_0$ and $Cb_0$ so as to maintain the ratio of the color-difference signals Cr and Cb to the input luminance signal Y.

The gray level correction processor shown in FIG. 2 requires fewer constituent parts since it is adapted to carry out gray level corrections only on the luminance signal Y, thus controlling an increase in cost and circuit scale. The gray level correction processor of FIG. 2, however, presents the problems described below.

First, an error occurs in correcting the luminance of a pixel having a larger color-difference signal value. The relationship between three primary color signals R, G and B, and the luminance signal Y or the color-difference signals Cr and Cb is represented by expressions (1) and (2) shown below:

$$Y=0.30R+0.59G+0.11B \quad (1)$$

$$Cr=R-Y$$

$$Cb=B-Y \quad (2)$$

In correcting the gray level of the luminance signal Y, the information regarding the color-difference signals Cr and Cb is not taken into account. The information indicating the balance among the three primary color signals R, G, and B is missing in the luminance signal Y. For this reason, the gray level correction of the luminance signal Y is not properly made on a pixel in which the three primary color signals R, G, and B are unbalanced, that is, a pixel having a greater color difference.

For instance, if an input red signal R has a maximum value (assumed to be 1), while input green signal G and blue signal B have minimum values (assumed to be 0), then the input luminance signal Y will be 0.3.

Such a pixel should be converted into a pixel in which the red signal R has the maximum value (assumed to be 1), while the green signal G and the blue signal B have the minimum value (assumed to be 0) after a gray level correction is made. After this conversion, the luminance signal Y of the pixel will be 0.3.

However, if, for example, the luminance correction circuit 12 is provided with the luminance correction LUT as shown in FIG. 3, then the luminance signal Y =0.3 will be converted into the luminance signal $Y_0$=0.6 in accordance with the luminance correction LUT, generating an error, as compared with a proper correction value (0.3 in this case). This problem may arise with all pixels other than achromatic pixels.

Second, a change in hue takes place. To be more specific, if, for example, the input red signal R has a maximum value, while the input green signal G and blue signal B have minimum values, then the color-difference signal Cr will have the maximum value. At this time, if the luminance signal Y=0.3 is converted into $Y_0$=0.6 in accordance with the LUT shown in FIG. 3, then the color-difference correction circuit 13 will multiply the color-difference signal Cr by 2 (=0.6/0.3).

The color-difference signal Cr, however, already has the maximum value, so that clipping will cause no changes, whereas the color-difference signal Cb, which does not take the maximum value, will be multiplied by 2. This poses a problem in that the value of Cr/Y cannot be maintained at a constant level and a hue change undesirably takes place.

Even if the value of Cr/Y is maintained constant by avoiding clipping on the color-difference signal Cr, the clipping will be eventually effected on the red signal R at the time of conversion into the three primary color signals R, G, and B, thus again causing an undesirable hue change to take place.

SUMMARY OF THE INVENTION

The present invention has been made with a view toward solving the above problems, and it is an object of the present invention to control the occurrence of a change in hue by adjusting the correction amount for a color-difference signal according to the gray level correction characteristic of a luminance signal when gray level correction is made only on a luminance signal Y of a pixel having a great color-difference signal value.

To this end, according to one aspect of the present invention, there is provided an image processing apparatus including a first generating device for generating a first conversion rule by using a first element of an input image signal, a second generating device for generating a second conversion rule on the basis of the first conversion rule, a first correcting device for correcting the first element of the input image signal by using the first conversion rule, an acquiring device for acquiring a correction parameter associated with the first element of the input image signal by using the second conversion rule, and a second correcting device for correcting a second element of the input image signal by using the correction parameter.

The first generating device may include a preparing device for preparing a histogram of the first element of the input image signal, an accumulating device for accumulating histograms to prepare a cumulative histogram, and an approximating device for approximating the cumulative histogram to a predetermined logarithmic curve thereby generating the first conversion rule.

The second correcting device may be adapted to correct the second element of the input image signal by multiplying the second element by the correction parameter.

The image processing apparatus according to the present invention may further include a converting device for converting an optical signal of a subject into a color signal, and a calculating device for calculating the first and second elements of the image signal on the basis of the color signal.

The converting device may be adapted to convert the optical signal of the subject into a red signal, a green signal, or a blue signal.

The converting device may be adapted to convert the optical signal of the subject into a yellow signal, a cyan signal, or a green signal.

The converting device may be adapted to convert the optical signal of the subject into a yellow signal, a cyan signal, a magenta signal, or a green signal.

According to another aspect of the present invention, there is provided an image processing method including a first generating step for generating a first conversion rule by using a first element of an input image signal, a second generating step for generating a second conversion rule on the basis of the first conversion rule, a first correcting step for correcting the first element of the input image signal by using the first conversion rule, an acquiring step for acquiring a correction parameter associated with the first element of the input image signal by using the second conversion rule, and a second correcting step for correcting a second element of the input image signal by using the correction parameter.

According to yet another aspect of the present invention, there is provided a recording medium in which a program has been recorded, the program including a first generating step for generating a first conversion rule by using a first element of an input image signal, a second generating step for generating a second conversion rule on the basis of the first conversion rule, a first correcting step for correcting the first element of the input image signal by using the first conversion rule, an acquiring step for acquiring a correction parameter associated with the first element of the input image signal by using the second conversion rule, and a second correcting step for correcting a second element of the input image signal by using the correction parameter.

According to the image processing apparatus and method and the program recorded in the recording medium therefor in accordance with the present invention, a first conversion rule is generated by using a first element of an input image signal, and a second conversion rule is generated on the basis of the first conversion rule. Furthermore, the first conversion rule is used to correct the first element of the input image signal, a correction parameter associated with the first element of the input image signal is acquired by using the second conversion rule, and a second element of the input image signal is corrected by using the correction parameter.

Additional features and advantages of the present invention are described in, and will be apparent from, the following Detailed Description of the Invention and the figures.

BRIEF DESCRIPTION OF THE FIGURES

FIG. 7 is a diagram showing an example of a color filter 36;

FIG. 15 is a block diagram showing a configuration example of an image processor 112 of a digital camera 110.

DETAILED DESCRIPTION OF THE INVENTION

The following will describe a digital camera that is an embodiment of the present invention. First, the principle of operation for correcting the gray levels of image signals in the digital camera will be explained with reference to FIGS. 4 and 5.

Figure 1:
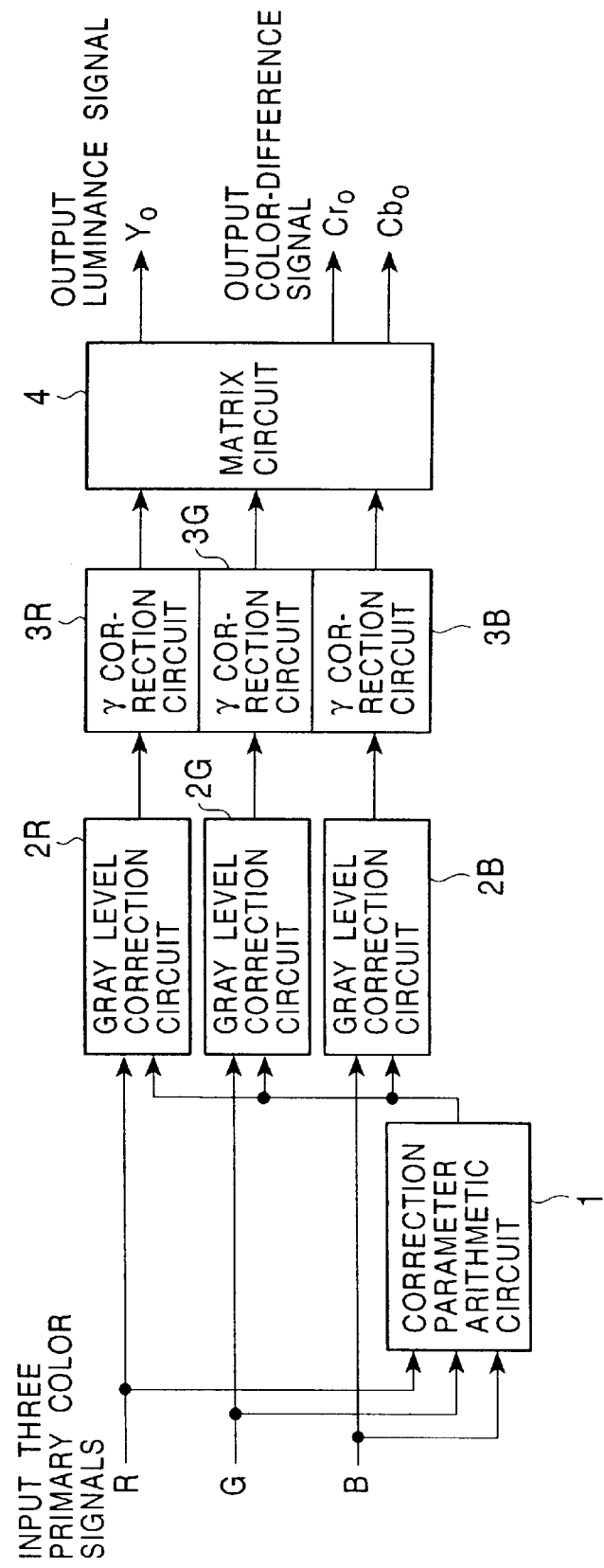
FIG. 1 is a block diagram illustrating a configuration example of a conventional gray level correction processor for individually correcting the gray levels of the three primary color signals R, G, and B.
Figure 2:
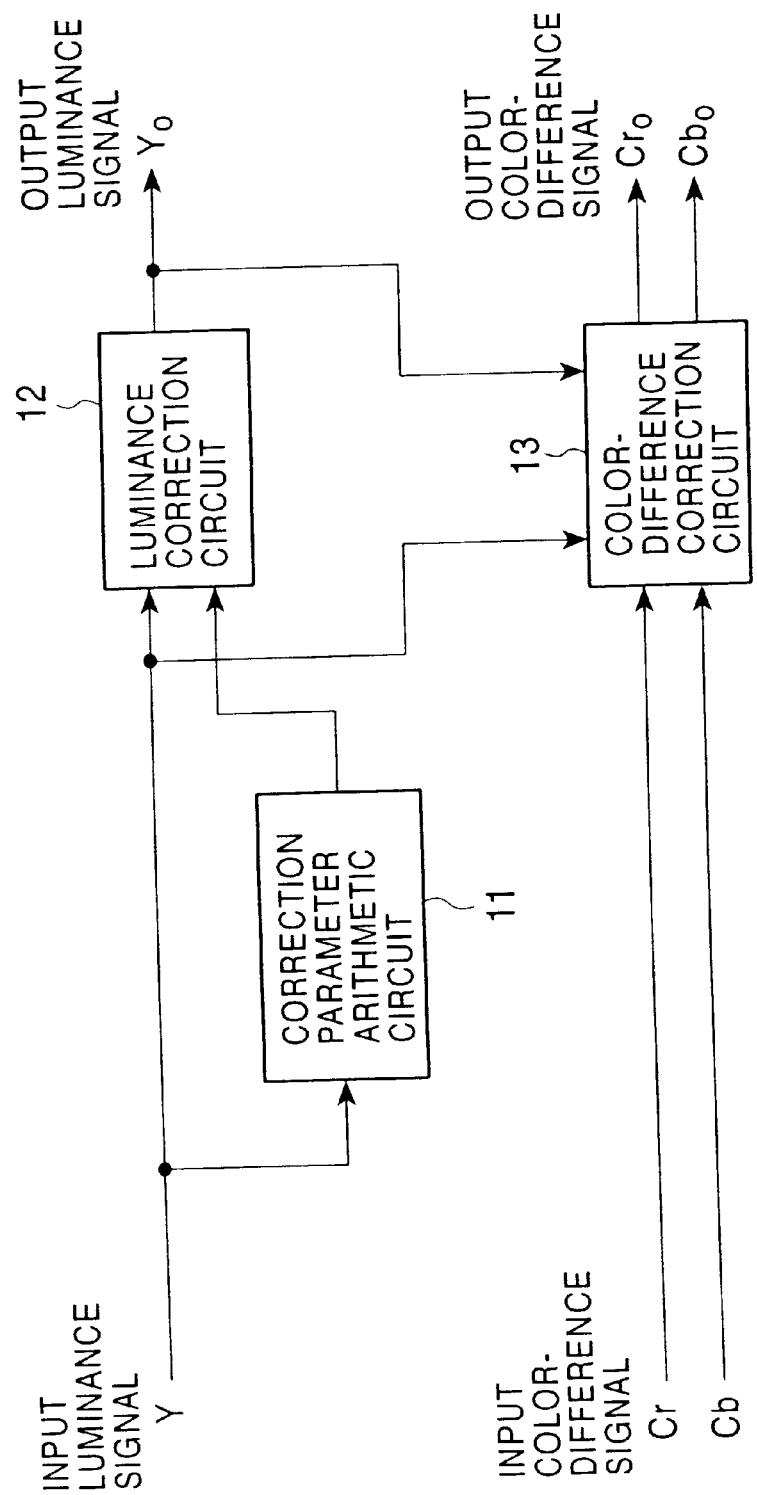
FIG. 2 is a block diagram illustrating a configuration example of a conventional gray level correction processor for performing gray level correction only on a luminance signal Y in an image signal.
Figure 3:
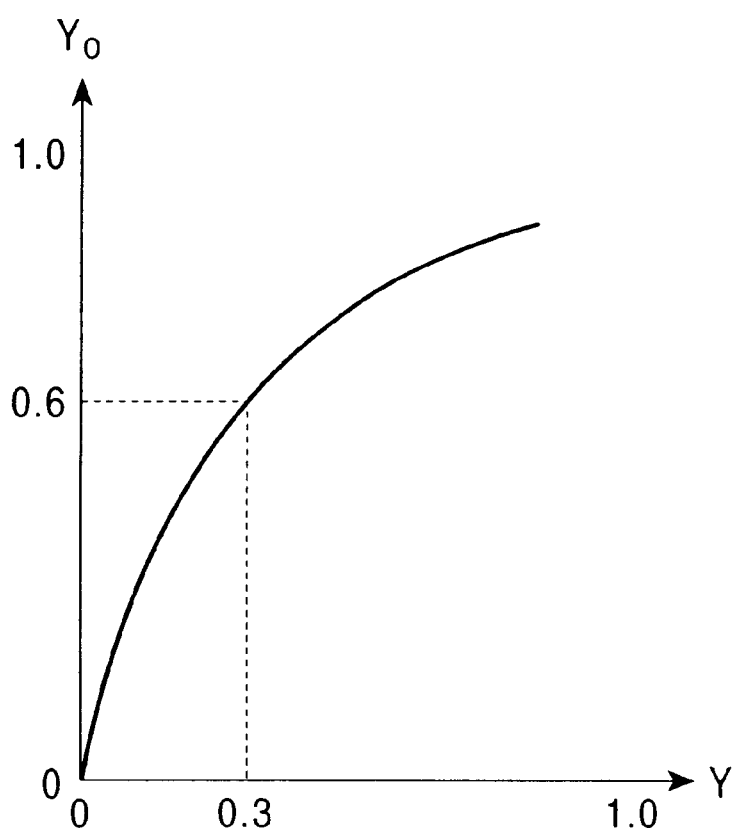
FIG. 3 is a diagram illustrating the gray level correction characteristic of the luminance signal.
Figure 4:
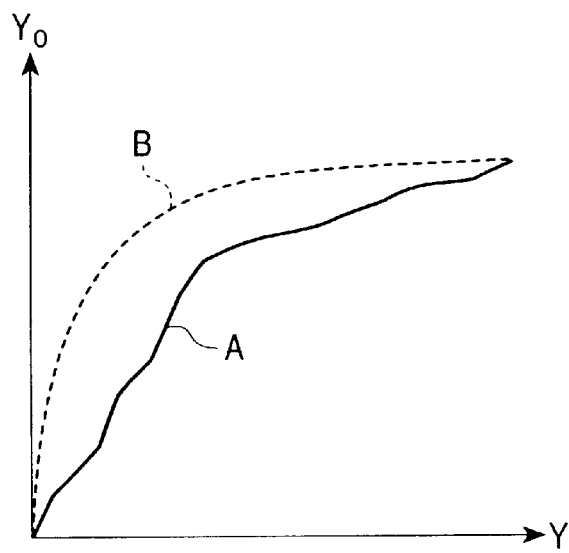
FIG. 4 is a diagram illustrating the principle of the gray level correction of a digital camera that is an embodiment of the present invention.

FIG. 4 illustrates an example of the LUT for correcting the gray level of luminance signal Y. The axis of abscissa of the chart shown in FIG. 4 indicates an input luminance level Y, while the axis of ordinates indicates an output luminance level Y0. The processing for generating the LUT for correcting the gray levels of the luminance signals Y will now be described.

First, a histogram of the luminance signals Y of an image, which indicates the distribution of the frequency of the luminance signals Y at each signal level, is generated. Then, the frequency at each signal level in the histogram is accumulated to generate a cumulative histogram (curve A in the chart), and the dynamic ranges of output luminance signals $Y_0$ are applied to the axis of ordinates. Subsequently, considering Weber-Fechner law regarding human visual characteristics (the sensory amount of humans is proportional to the logarithm of stimulation intensity), the curve A is subjected to logarithmic approximation to acquire a curve B. The curve B is obtained by expression (3) given below:

$$Y_0 = a \cdot \log(Y) + b \quad (3)$$

Expression (3) is employed to obtain expression (4) given below:

$$Y_0 = E_2(E_1(Y)) = \log(E_1(Y)) + b = \log(Y^a) + b \quad (4)$$

where a function $E_1(x)$ denotes the processing for compressing the dynamic range of the luminance signal Y by using an exponential function. A function $E_2(x)$ denotes the processing for changing the input/output characteristics of luminance according to visual characteristics, while maintaining the dynamic ranges.

To prevent the color-difference signals Cr and Cb from being clipped, no color correction will be made on the function $E_1(x)$, and the color balance will be maintained for the function $E_2(x)$.

In other words, expression (5) shown below will hold:

$$Cr_0/Y_0 = Cra/Ya$$

$$Cb_0/Y_0 = Cba/Ya \quad (5)$$

where Cr and Cb denote input color-difference signals, $Cr_0$ and $Cb_0$ denote output color-difference signals, the gray levels of which have been corrected, and "a" denotes a predetermined parameter, which will be discussed hereinafter.

Empirically approximating expression (3) leads to expression (6) shown below:

$$Cr_0 \approx \frac{(Y_0)^{\frac{1}{a}}}{Y} Cr$$

$$Cb_0 \approx \frac{(Y_0)^{\frac{1}{a}}}{Y} Cb \quad (6)$$

Expression (6) represents the gray level correction characteristics for the color-difference signals Cr and Cb.

Thus, expression (3) is applied to make gray level corrections on the luminance signals Y, and expression (6) is applied to make gray level corrections on the color-difference signals Cr and Cb. This makes it possible to narrow the dynamic range of image signals, while controlling the occurrence of hue changes.

Figure 5:
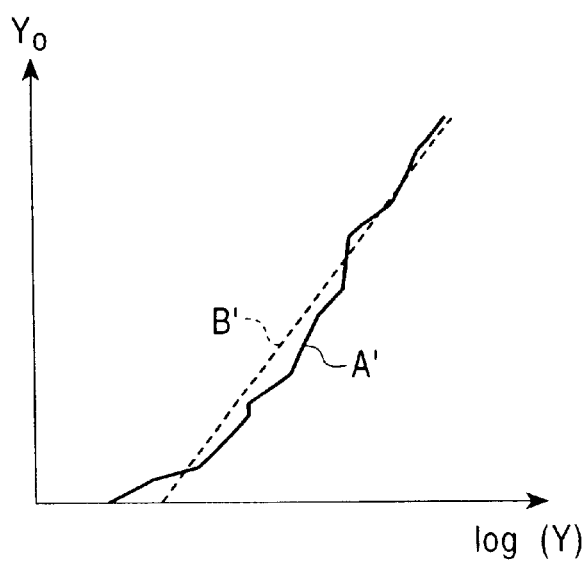
FIG. 5 is another diagram illustrating the principle of the gray level correction of the digital camera that is the embodiment of the present invention.

Referring now to FIG. 5, the descriptions will be given of a method for calculating the parameter "a" used for correcting the gray levels of the color-difference signals Cr and Cb by using only the input luminance signals Y. The chart shown in FIG. 5 is obtained by logarithmically converting the axis of abscissa of the chart shown in FIG. 4. A curve A' corresponds to the curve A shown in FIG. 4. A straight line B' is obtained by linearly approximating the curve A'. Hence, the straight line B' can be considered to correspond to a curve B shown in FIG. 4.

Accordingly, the gray level correction functions of the color-difference signals Cr and Cb as represented by expression (7) below can be obtained by determining a gradient "α" of the straight line B', then by substituting the value of "α" for "a" of expression (6).

$$Cr_0 = kCr = \frac{(Y_0)^{\frac{1}{\alpha}}}{Y}Cr \tag{7}$$

$$Cb_0 = kCb = \frac{(Y_0)^{\frac{1}{\alpha}}}{Y}Cb$$

where "k" in expression (7) denotes a correction value parameter of the color-difference signals.

Figure 6:
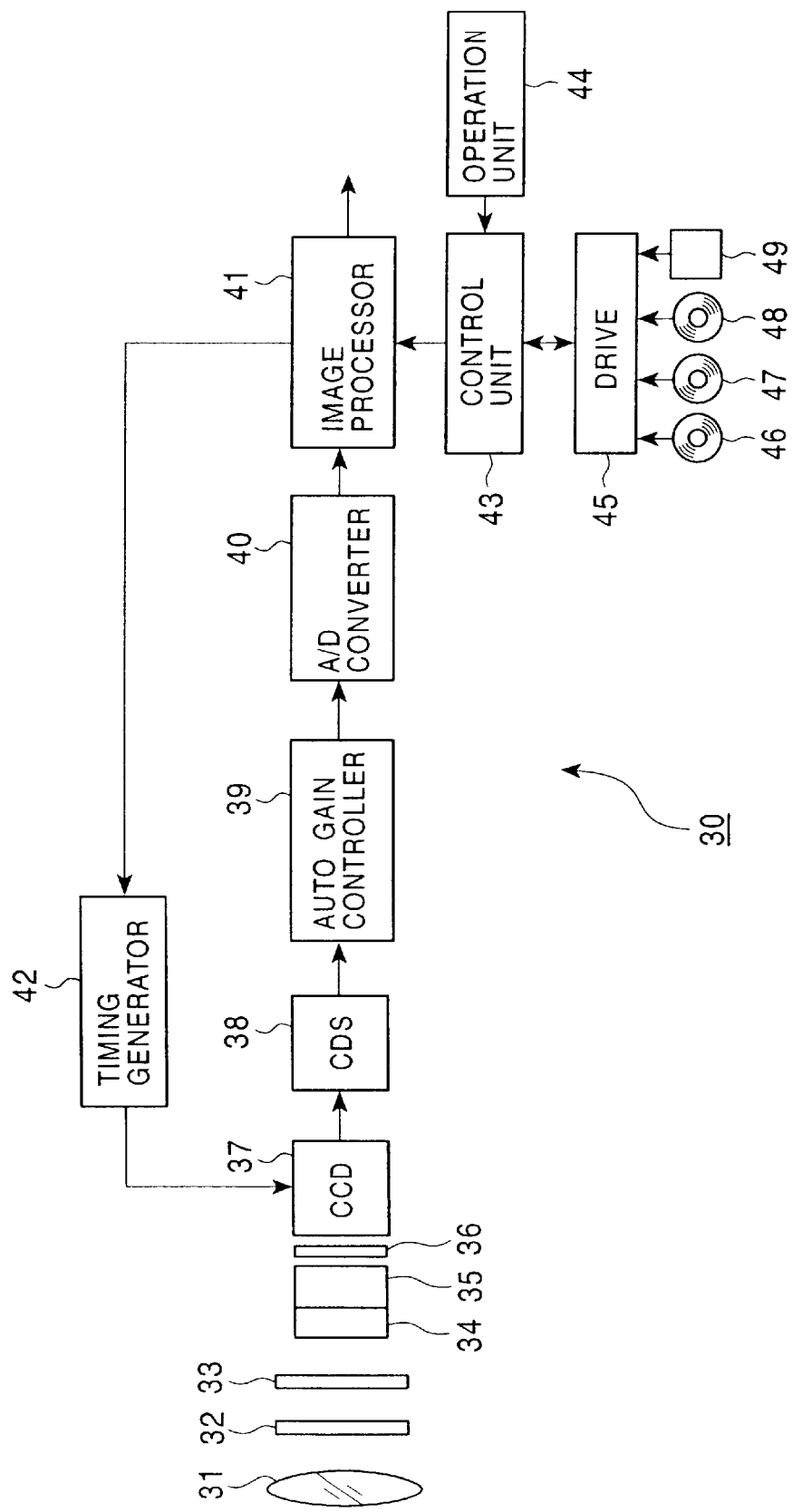
FIG. 6 is a block diagram showing a first configuration example of the digital camera that is an embodiment of the present invention.

Referring now to FIG. 6, a first configuration example of the digital camera, which is the embodiment of the present invention, will be described A digital camera 30 using a single-chip CCD acquires the optical images of a subject in the form of image signals of a wide dynamic range (e.g., 16-bit width) and converts them into image signals of a narrow dynamic range (e.g., 8-bit width), as necessary, then outputs the image signals of the narrow dynamic range.

Figures 7A, 7B, 7C:
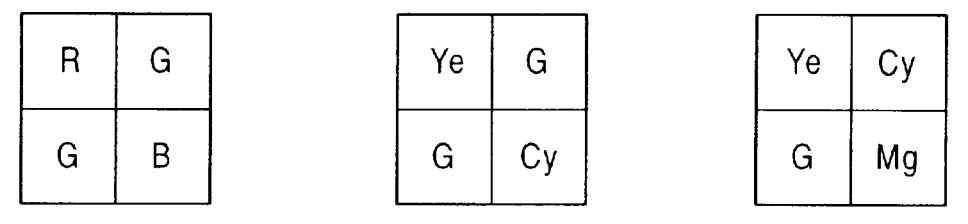

The optical system of the digital camera 30 includes a lens 31 for condensing the optical images of a subject, an aperture 32 for adjusting the quantity of light of optical images, a shutter 33 for adjusting the incident time of optical images, an infrared blocking filter (IR filter) 34 for removing light rays in an infrared range in which a CCD 37 is extremely sensitive, an optical low-pass filter (LPF) 35 for removing high-frequency components from light to restrain turnovers that occur when the CCD 37 carries out discrete sampling, and a color filter 36 having the primary colors (red (R), green (G), and blue (B)) arranged as shown in, for example, FIG. 7A, for extracting the three primary colors, R, G, and B, from optical signals.

The lens 31 may be provided with a coating for shielding against infrared ranges so as to obviate the need for providing the infrared blocking filter 34.

FIG. 7 shows the color filter 36 covering the ranges for the four pixels of the CCD 37. For the color filter 36, the filter of the complementary colors (yellow (Ye), cyan (Cy), and magenta (Mg)) and green (G) arranged as shown in, for example, FIG. 7B or FIG. 7C may be used.

The digital camera 30 is constructed with the CCD 37 which photoelectrically converts the optical images received through the intermediary of the optical system and outputs image signals of a wide dynamic range to a correlated double sampling (CDS) circuit 38. The CDS circuit 38 samples the image signals supplied from the CCD 37, thereby reducing noise. An auto gain controller (AGC) 39 is provided for electrically amplifying the amplitudes of image signals according to the brightness of a subject and an A/D converter 40 digitizes the analog image signals. An image processor 41 formed primarily of a digital signal processor (DSP) converts the digital image signals of a wide dynamic range into digital image signals of a narrow dynamic range. Meanwhile, a timing generator 42 is provided for generating horizontal scanning timings and vertical scanning timings of the CCD 37. A control unit 43 controls a drive 45 to read a control program stored in a magnetic disk 46, an optical disk 47, a magneto-optical disk 48, or a semiconductor memory 49, and controls the entire digital camera 30 mainly according to the read control program and a command from a user entered through an operation unit 44.

In addition to changing the dynamic range of input digital image signals, the image processor 41 compresses and encodes input digital image signals into still images according to the joint photographic experts group (JPEG) method or the like and records the still images in a predetermined recording medium, or compresses and encodes input digital image signals into animation images according to the moving picture experts group (MPEG) method or the like and records the animation images in a predetermined recording medium, or reads encoded image signals from a predetermined recording medium and decodes them.

In the digital camera 30, an optical image entered through the intermediary of the optical system which includes all of the components from the lens 31 through the color filter 36, is converted into an image signal of a wide dynamic range by the CCD 37. The image wsignal is then subjected to noise reduction processing by the CDS circuit 38 and amplitude amplification by the AGC 39. The signal is then digitized by the A/D converter 40, and supplied to the image processor 41, where the digital image signal of the wide dynamic range supplied to the image processor 41 is converted into a digital image signal of a narrow dynamic range.

Figure 8:
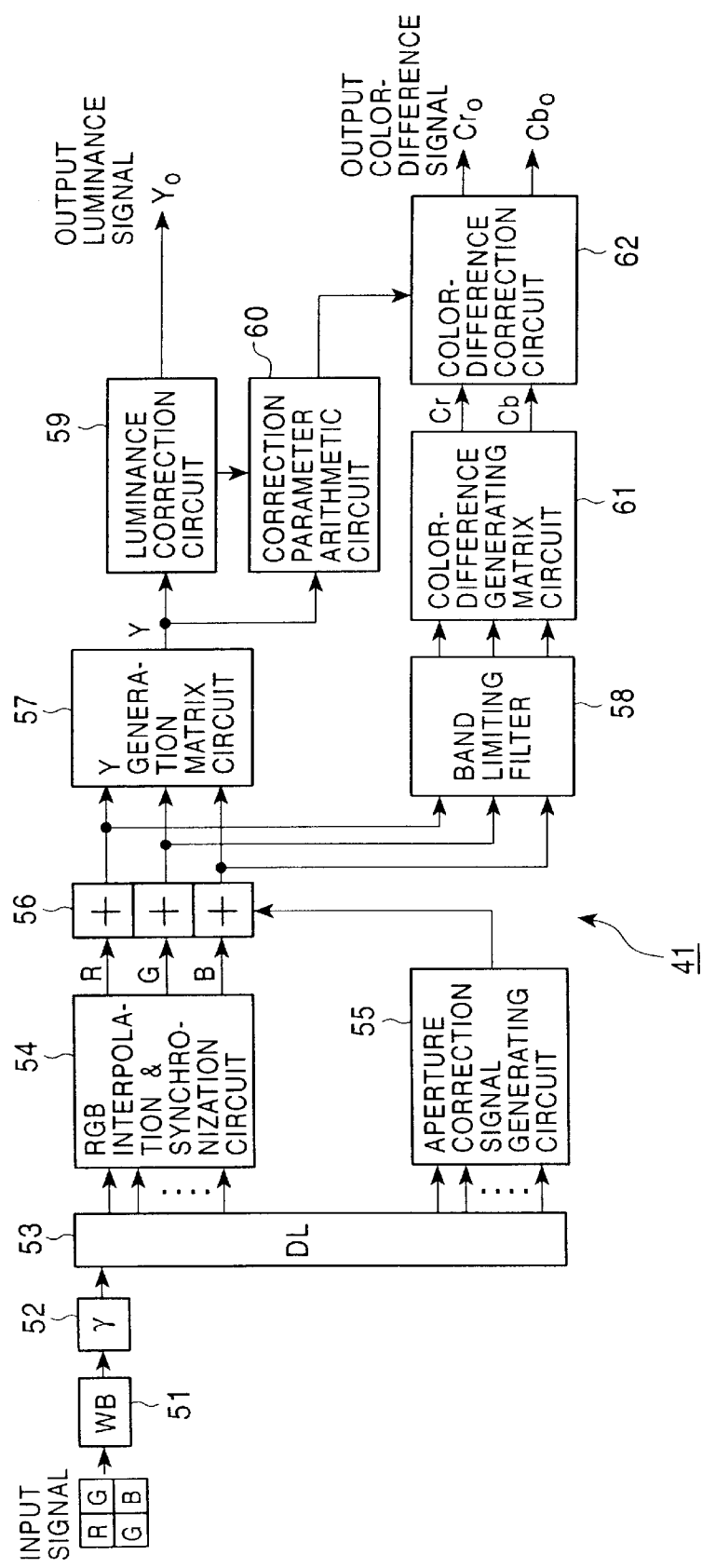
FIG. 8 is a block diagram showing a first configuration example of an image processor 41 of a digital camera 30.

FIG. 8 shows in detail a first configuration of the image processor 41. One of the three primary color signals R, G, and B, which have been digitized, is supplied for one pixel to the image processor 41.

A white balance circuit (WB) 51 adjusts the primary color signal level of each pixel to accomplish color balance in an image, and outputs the image to a gamma (γ) correction circuit 52. The gamma correction circuit 52 carries out gamma correction on the primary color signal of each pixel, and supplies the result to a delay circuit (DL) 53. The delay circuit 53 synchronizes the phases of the signals of color channels that have different sampling phases. The signals will be used for the processing in which an RGB interpolation and synchronization circuit 54 restores the three primary color signals R, G, and B of each pixel by using a predetermined number of adjacent pixels. The signals are also used for the processing in which an aperture correction signal generating circuit 55 generates edge highlighting signals by employing a predetermined number of adjacent pixels. The delay circuit 53 outputs the signals with synchronized phases to the RGB interpolation and synchronization circuit 54 and the aperture correction signal generating circuit 55.

In order to restore the three primary color signals R, G, and B for each of all pixels, the RGB interpolation and synchronization circuit 54 interpolates missing color signals by using the red signals R, the green signals G, or the blue signals B of pixels adjacent to target pixels, and synchronizes the phases of the three primary color signals R, G, and B for the pixels, then simultaneously outputs them to an adder 56. The aperture correction signal generating circuit 55 generates the edge highlighting signal for each of all pixels by using the red signal R, the green signal G, or the blue signal B of a pixel adjacent to a target pixel, and outputs the generated signals to the adder 56.

The adder 56 adds the edge highlighting signals received from the aperture correction signal generating circuit 55 to the three primary color signals R, G, and B received from the RGB interpolation and synchronization circuit 54 to perform an f characteristic correction, and outputs the results to a luminance signal generating matrix circuit 57 and a band limiting filter 58.

The luminance signal generating matrix circuit 57 substitutes the three primary color signals R, G, and B received from the adder 56 into expression (1) to generate the luminance signal Y, and outputs the luminance signal Y to a luminance correction circuit 59 and a correction parameter arithmetic circuit 60.

The band limiting filter 58 restricts the bands of the three primary color signals R, G, and B from the adder 56 in order to adjust them to the bands of the color-difference signals Cr and Cb, then outputs the three primary color signals to a color-difference signal generating matrix circuit 61. The color-difference generating matrix circuit 61 substitutes the three primary color signals R, G, and B with the restricted bands into expressions (1) and (2) thereby to generate the color-difference signals Cr and Cb, and outputs the color-difference signals Cr and Cb to a color-difference correction circuit 62.

The luminance correction circuit 59 corrects the luminance signal Y received from the luminance signal generating matrix circuit 57 into a luminance signal $Y_0$, and outputs the corrected luminance signal $Y_0$ to the correction parameter arithmetic circuit 60. The correction parameter arithmetic circuit 60 generates a correction parameter k corresponding to the luminance signal Y received from the luminance signal generating matrix circuit 57, and outputs the correction parameter k to the color-difference correction circuit 62. The color-difference correction circuit 62 multiplies the color-difference signals Cr and Cb received from the color-difference signal generating matrix circuit 61 by the correction parameter k received from the correction parameter arithmetic circuit 60 so as to generate color-difference signals $Cr_0$ and $Cb_0$.

Figure 9:
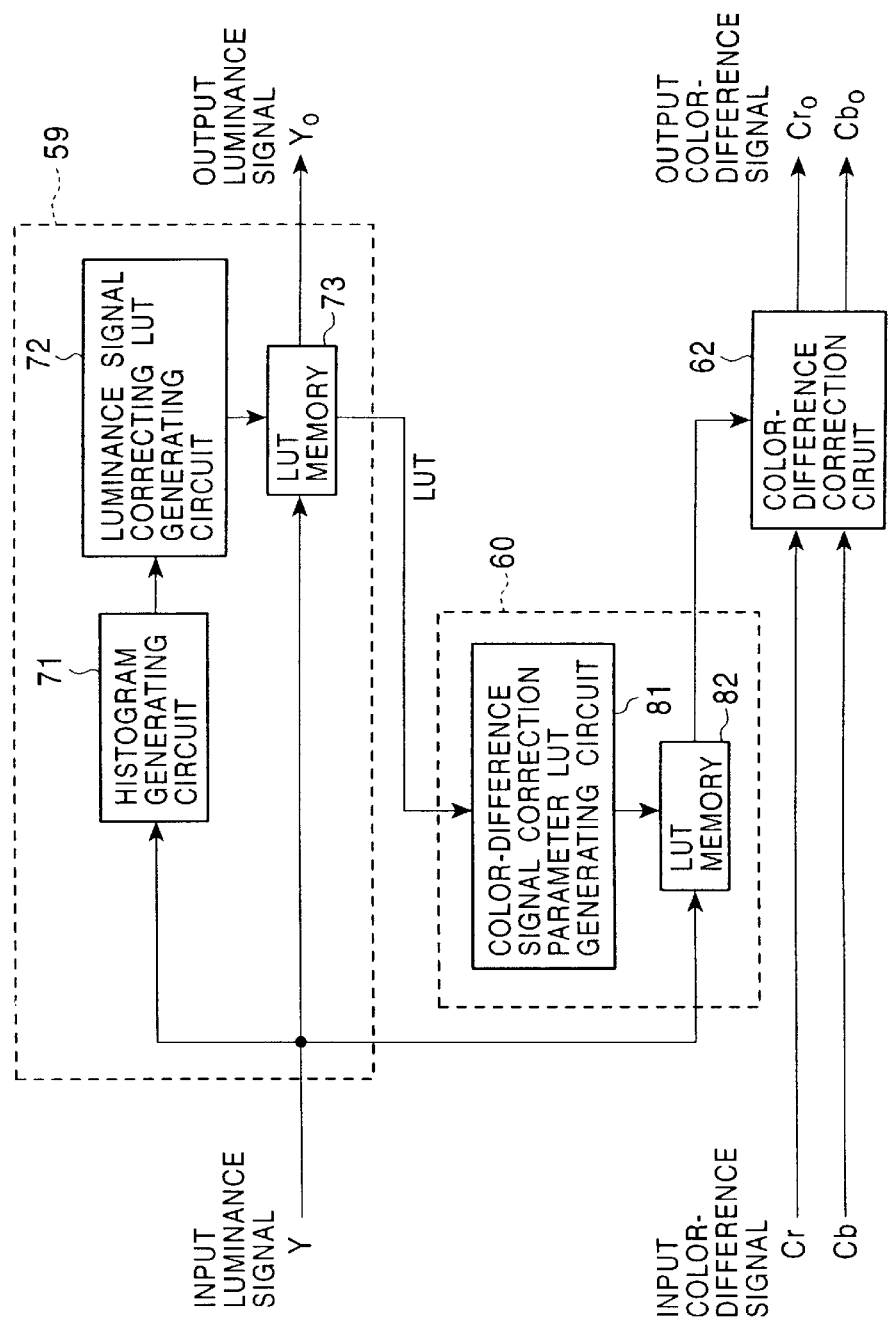
FIG. 9 is a block diagram showing example configurations of a luminance correction circuit 59 and a correction parameter arithmetic circuit 60.

FIG. 9 shows the detailed configuration examples of the luminance correction circuit 59 and the correction parameter arithmetic circuit 60 in the image processor 41.

A histogram generating circuit 71 of the luminance correction circuit 59 generates, in units of images, the histograms of the luminance signals Y sequentially supplied from the luminance signal generating matrix circuit 57, and outputs the histograms to a luminance signal correction LUT generating circuit 72. The luminance signal correction LUT generating circuit 72 accumulates the histograms of the luminance signals Y supplied from the histogram generating circuit 71 so as to create a cumulative histogram, as indicated by a curve A in FIG. 4, and performs logarithmic approximation on the cumulative histogram to create the luminance signal correction LUT, as indicated by a curve B in FIG. 4, then outputs the luminance signal correction LUT to a LUT memory 73. The LUT memory 73 stores the luminance signal correction LUTs supplied from the luminance signal correction LUT generating circuit 72, and applies the luminance signals Y received from the luminance signal generating matrix circuit 57 to the luminance signal correction LUTs to obtain corrected luminance signals $Y_0$.

The color-difference signal correction parameter LUT generating circuit 81 refers to a luminance signal correction LUT retained in the LUT memory 73 to generate a color-difference signal correction parameter LUT indicating the correspondence relationship between the luminance signal Y and the correction parameter k (expression (7)), and outputs the generated color-difference signal correction parameter LUT to a LUT memory 82. The LUT memory 82 stores the color-difference signal correction parameter LUTs received from the color-difference signal correction parameter LUT generating circuit 81, and also applies the luminance signals Y received from the luminance signal generating matrix circuit 57 to the color-difference signal correction parameter LUTs to obtain the correction parameter k, then outputs the correction parameter k to the color-difference correction circuit 62.

Figure 10:
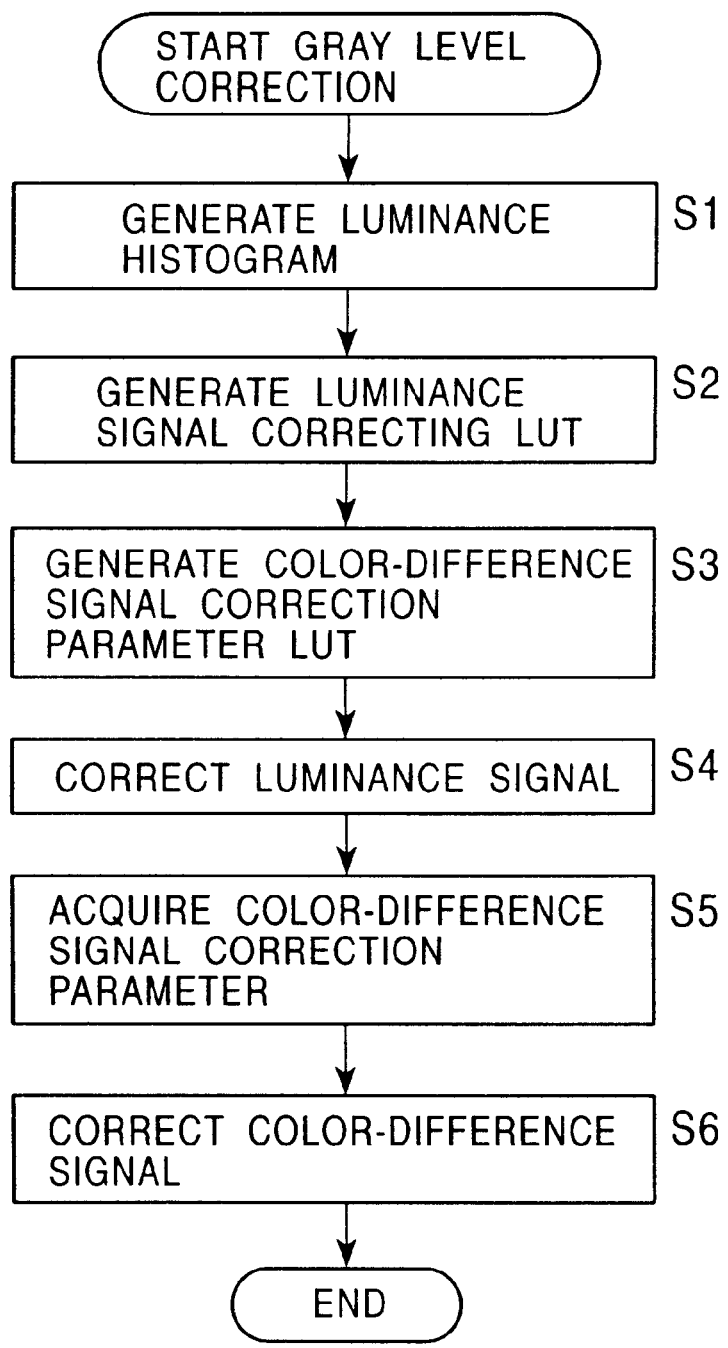
FIG. 10 is a flowchart illustrating the gray level correction processing carried out by the image processor 41.

Referring now to the flowchart of FIG. 10, the gray level correction processing carried out by the image processor 41 will be described. The gray level correction processing is performed on the luminance signals Y output from the luminance signal generating matrix circuit 57 and the color-difference signals Cr and Cb output from the color-difference signal generating matrix circuit 61.

In step S1, the histogram generating circuit 71 of the luminance correction circuit 59 generates, in units of images, the histograms of the luminance signals Y received from the luminance signal generating matrix circuit 57, and outputs the histograms to the luminance signal correction LUT generating circuit 72. In step S2, the luminance signal correction LUT generating circuit 72 accumulates the histograms of the luminance signals Y received from the histogram generating circuit 71 to generate a cumulative histogram, and subjects the cumulative histogram to logarithmic approximation thereby to generate a luminance signal correction LUT. The generated luminance signal correction LUT is stored in the LUT memory 73.

In step S3, the color-difference signal correction parameter LUT generating circuit 81 refers to a luminance signal correction LUT retained in the LUT memory 73 to generate a color-difference signal correction parameter LUT, and stores the generated color-difference signal correction parameter LUT in the LUT memory 82.

In step S4, the LUT memory 73 applies the luminance signal Y received from the luminance signal generating matrix circuit 57 to the luminance signal correction LUT to acquire a corrected luminance signal $Y_0$.

In step S5, the LUT memory 82 applies the luminance signal Y received from the luminance signal generating matrix circuit 57 to the color-difference signal correction parameter LUT, and outputs the obtained correction parameter k to the color-difference correction circuit 62.

In step S6, the color-difference correction circuit 62 multiplies the color-difference signals Cr and Cb received from the color-difference signal generating matrix circuit 61 by the correction parameter k from the LUT memory 73 so as to obtain corrected color-difference signals $Cr_0$ and $Cb_0$.

As explained above, according to the gray level correction processing carried out by the image processor 41, the correction parameter k acquired from the color-difference signal correction parameter LUT generated on the basis of the luminance signal Y gray level correction LUT is used as a multiplier to correct the color-difference signals Cr and Cb. Hence, the corrected color-difference signals $Cr_0$ and $Cb_0$ do not overflow, thus restraining changes in hue.

Figure 11:
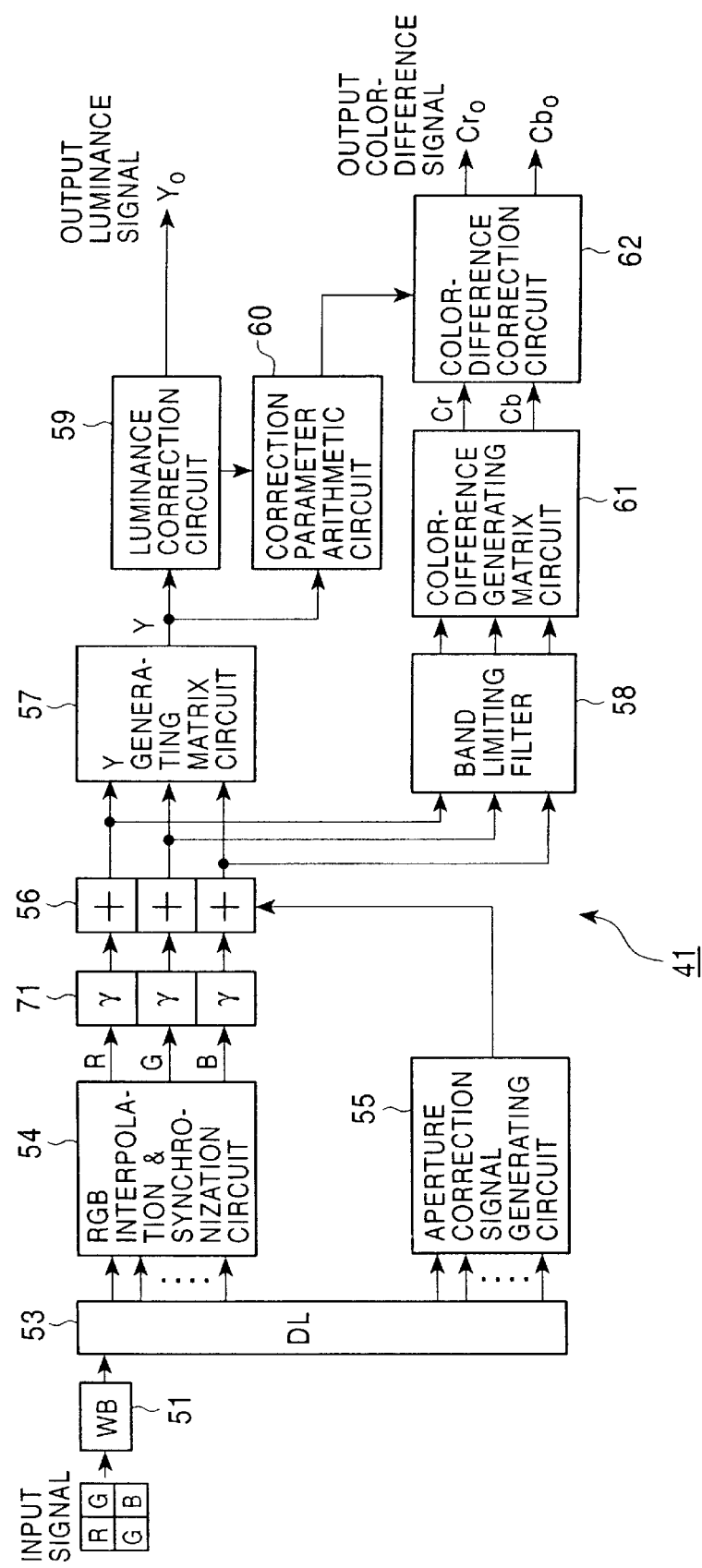
FIG. 11 is a block diagram showing a second configuration example of the image processor 41 of the digital camera 30.

FIG. 11 shows the details of a second configuration example of the image processor 41. The second configuration example is different from the first configuration example shown in FIG. 8 in that the gamma correction circuit 52 has been replaced by a gamma correction circuit 71 provided between the RGB interpolation & synchronization circuit 54 and the adder 56. In the second configuration example shown in FIG. 11, the same circuits as those in the first configuration example shown in FIG. 8 will be assigned the same reference numerals, and the descriptions thereof will not be repeated.

Figure 12:
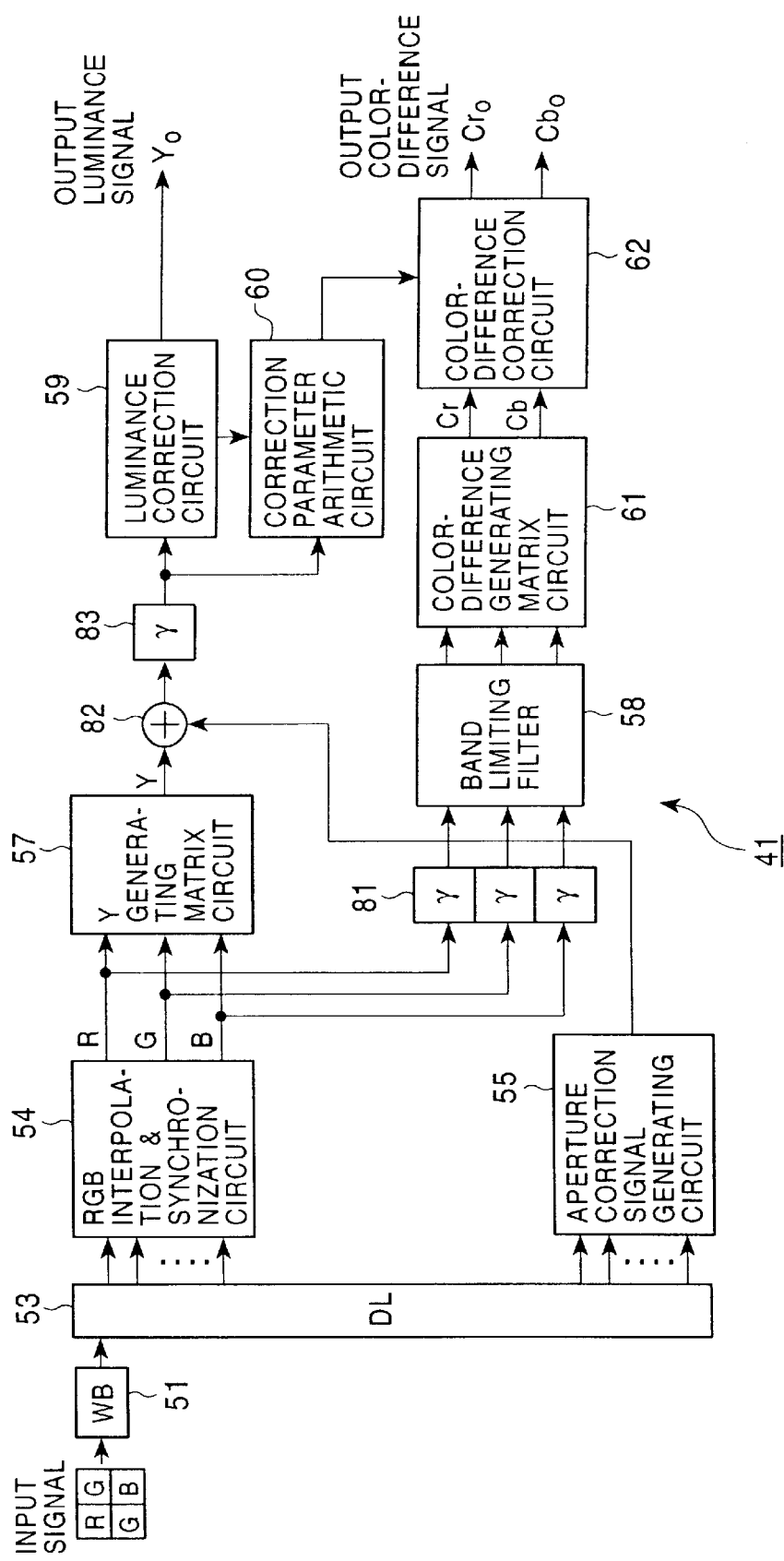
FIG. 12 is a block diagram showing a third configuration example of the image processor 41 of the digital camera 30.

FIG. 12 shows in detail a third configuration example of the image processor 41. The third configuration example is different from the first configuration example shown in FIG. 8 in that the gamma correction circuit 52 and the adder 56 have been removed. Instead, a gamma correction circuit 81, an adder 82, and a gamma correction circuit 83 are provided in the third configuration example.

The gamma correction circuit 81 carries out gamma correction on the three primary color signals R, G, and B from the RGB interpolation & synchronization circuit 54, and outputs the results to the band limiting filter 58. The adder 82 adds an edge highlighting signal from the aperture correction signal generating circuit 55 to the luminance signal Y from the luminance signal generating matrix circuit 57 thereby to make an f characteristic correction, and outputs the result to the gamma correction circuit 83. The gamma correction circuit 83 carries out gamma correction on the luminance signal Y with the corrected f characteristic received from the adder 82, and outputs the result to the luminance correction circuit 59 and the correction parameter arithmetic circuit 60. In the third configuration example shown in FIG. 12, the same circuits as those in the first configuration example shown in FIG. 8 are assigned the same reference numerals, and the descriptions thereof will not be repeated.

Figure 13:
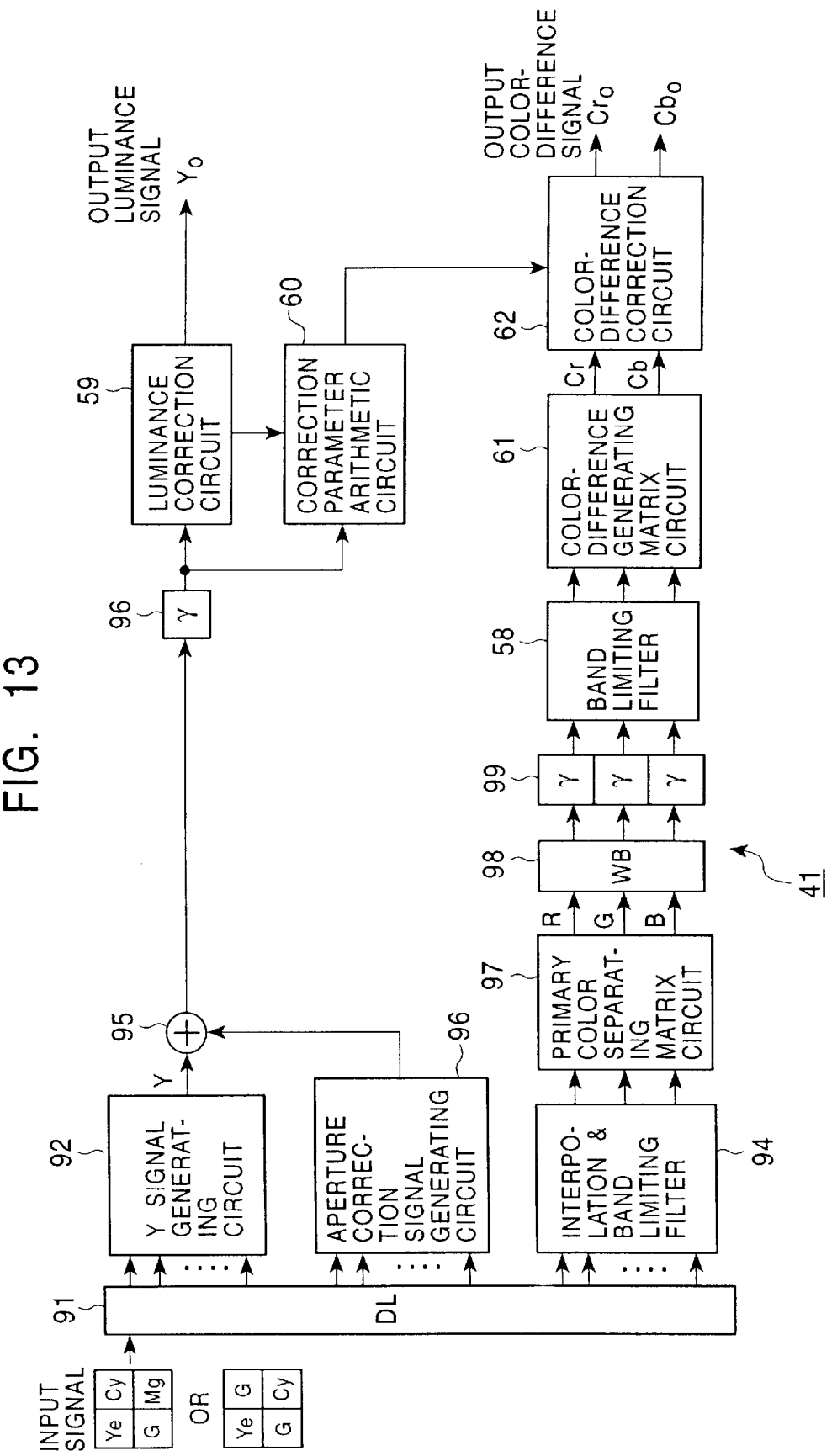
FIG. 13 is a block diagram showing a fourth configuration example of the image processor 41 of the digital camera 30.

FIG. 13 shows a detailed block diagram of a fourth configuration example of the image processor 41. In the fourth configuration example, the color filter 36 of the digital camera 30 shown in FIG. 6 uses the filter of the complementary colors arranged as shown in FIG. 7B or FIG. 7C.

If the color filter 36 uses the filter of the complementary colors arranged as shown in FIG. 7B, then digitized complementary color signals Ye, G, and Cy will be supplied to the image processor 41 shown in FIG. 13. If the color filter 36 uses the filter of the complementary colors arranged as shown in FIG. 7C, then digitized complementary color signals Ye, Cy, G, and Mg will be supplied to the image processor 41 shown in FIG. 13. The following will describe a case where the color filter 36 uses the filter of the complementary colors arranged as shown in FIG. 7B, and the image processor 41 shown in FIG. 13 receives digitized complementary color signals Ye, G, and Cy.

A delay circuit 91 synchronizes the phases of the signals of the complementary color channels having different sampling phases that have been received from an upper stage. The delay circuit 91 supplies the signals with the synchronized phases to a luminance signal generating circuit 92, an aperture correction signal generating circuit 93, and an interpolation and band limiting filter 94. The luminance signal generating circuit 92 generates the luminance signals Y for all pixels by using the complementary color signals Ye, G, and Cy of the pixels in the neighborhood, and outputs the generated luminance signals Y to an adder 95. The aperture correction signal generating circuit 93 generates edge highlighting signals respectively corresponding to all the pixels by using the complementary color signals Ye, G, and Cy of the pixels in the neighborhood, and outputs the generated edge highlighting signals to the adder 95.

In order to restore the complementary color signals Ye, G, and Cy for each of all pixels, the interpolation and band limiting filter 94 interpolates missing complementary color signals by using the complementary color signals Ye, G, and Cy of pixels adjacent to target pixels, and synchronizes the phases of the complementary color signals Ye, G, and Cy for the pixels, then outputs them to a primary color separating matrix circuit 97.

The adder 95 adds the edge highlighting signals received from the aperture correction signal generating circuit 93 to the luminance signals Y received from the luminance signal generating circuit 92 thereby to effect an f characteristic correction, and outputs the results to a gamma correction circuit 96. The gamma correction circuit 96 carries out gamma correction on the luminance signals Y, which has been subjected to the f characteristic correction, from the adder 95, and outputs the results to a luminance correction circuit 59 and the correction parameter arithmetic circuit 60.

The primary color separating matrix circuit 97 generates the three primary color signals R, G, and B by using the complementary color signals Ye, G, and Cy for each pixel supplied from the interpolation and band limiting filter 94, and outputs the generated signals to a white balance circuit 98.

The white balance circuit 98 adjusts the levels of the three primary color signals R, G, and B of each pixel to accomplish color balance in an image, and outputs the image to a gamma correction circuit 99. The gamma correction circuit 99 carries out gamma correction on the three primary color signals R, G, and B of each pixel, and supplies the result to a band limiting filter 58.

In the fourth configuration example shown in FIG. 13, the same circuits as those of the first configuration example shown in FIG. 8 are assigned the same reference numerals, and the descriptions thereof will not be repeated.

Figure 14:
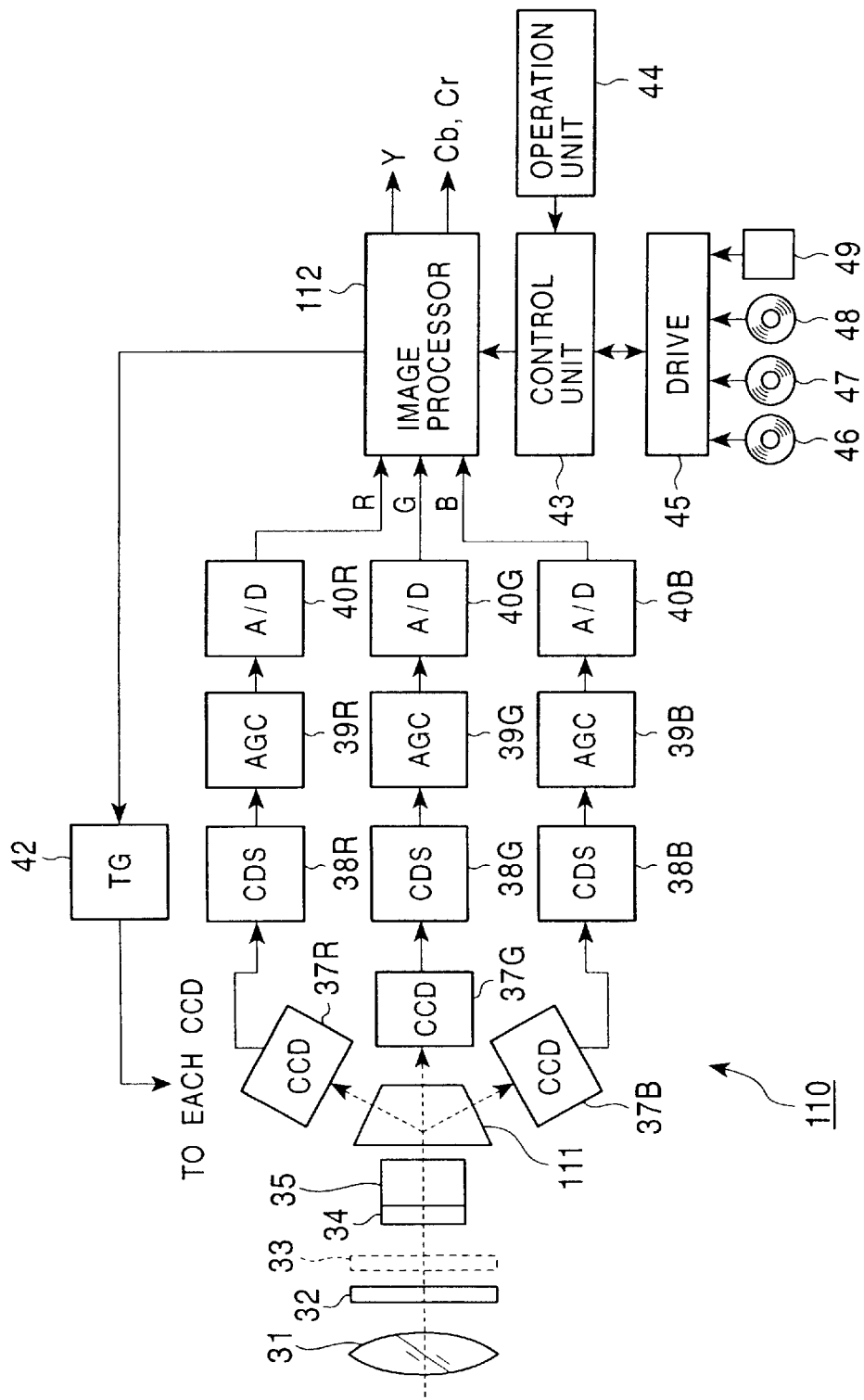
FIG. 14 is a block diagram showing a second configuration example of the digital camera, which is an embodiment of the present invention.

FIG. 14 shows a second configuration example of the digital camera according to the embodiment of the present invention. As in the case of the digital camera 30 shown in FIG. 6, a digital camera 110 acquires the optical images of a subject in the form of image signals of a wide dynamic range (e.g., 16-bit width) and converts them into image signals of a narrow dynamic range (e.g., 8-bit width), as necessary, then outputs the image signals of the narrow dynamic range.

The digital camera 110 uses a three-chip CCD (a CCD 37R through 37B), whereas the digital camera 30 shown in FIG. 6 uses the single-chip CCD (the CCD 37). This means that the digital camera 110 obviates the need for the color filter 36 used in the digital camera 30. In place of the color filter 36, a color separation prism 111 is provided for separating optical signals input through the intermediary of a lens 31 through a low pass filter 35 into the three primary color signals R, G, and B. Furthermore, the digital camera 110 is provided with the CCD 37R through an A/D converter 40R, a CCD 37G through an A/D converter 40G, and the CCD 37B through an A/D converter 40B for the three primary color signals R, G, and B, respectively, in place of the CCD 37 through the A/D converter 40 in the digital camera 30. An image processor 112 of the digital camera 110 receives the three primary color signals R, G, and B of a wide dynamic range for each pixel.

FIG. 15 detailedly shows a configuration example of the image processor 112. The image processor 112 receives all the three primary color signals R, G, and B for each pixel.

A white balance circuit 121R adjusts the level of an input red signal R and outputs the result to a gamma correction circuit 122R and a delay circuit 123. A white balance 121G adjusts the level of an input green signal G and outputs the result to a gamma correction circuit 122G and the delay circuit 123. The white balance circuit 121B adjusts the level of an input blue signal B and outputs the result to a gamma correction circuit 122B and the delay circuit 123.

The gamma correction circuit 122R carries out gamma correction on the red signal R from the white balance circuit 121R, and outputs the result to a luminance signal generating matrix circuit 125 and a band limiting filter 127. The gamma correction circuit 122G carries out gamma correction on the green signal G from the white balance circuit 121G, and outputs the result to the luminance signal generating matrix circuit 125 and a band limiting filter 127. The gamma correction circuit 122B carries out gamma correction on the blue signal B from the white balance circuit 121B, and outputs the result to the luminance signal generating matrix circuit 125 and the band limiting filter 127.

The delay circuit 123 simultaneously supplies the three primary color signals R, G, and B of a few pixels in the vicinity of a target pixel to an aperture correction signal generating circuit 124. The signals are used for generating the edge highlighting signal for each pixel at the aperture correction signal generating circuit 124. The aperture correction signal generating circuit 124 generates edge highlighting signals for all pixels by using the three primary color signals R, G, and B of the pixels in the neighborhood, and supplies the generated edge highlighting signals to an adder 126.

The luminance signal generating matrix circuit 125 substitutes the three primary color signals R, G, and B received from the gamma correction circuit 122R through 122B into expression (1) to generate the luminance signal Y, and outputs the generated luminance signal Y to the adder 126. The adder 126 adds the edge highlighting signal received from the aperture correction signal generating circuit 124 to the luminance signal Y received from the luminance signal generating matrix circuit 125 thereby to perform the f characteristic correction, and outputs the result to a luminance correction circuit 59 and a correction parameter arithmetic circuit 60.

The band limiting filter 127 restricts the bands of the three primary color signals R, G, and B received from the gamma correction circuits 122R through 122B so as to adjust the bands of the three primary color signals to the bands of the color-difference signals Cr and Cb, and outputs the results to a color-difference signal generating matrix circuit 61.

In the configuration example of the image processor 112 shown in FIG. 15, the same circuits as those in the first configuration example of the image processor 41 shown in FIG. 8 are assigned the same reference numerals, so that the descriptions will not be repeated.

The present invention can be applied also to a case where gray levels are changed without changing the dynamic ranges of images.

Moreover, the present invention can be applied to electronic equipment adapted to process image signals, including, for example, scanners, facsimiles, and copier, in addition to the digital camera in the embodiment.

It is possible to carry out a series of the processing steps described above by hardware and also by software. To carry out the series of processing steps by software, a computer in which a program constituting the software has been installed in dedicated hardware is used, or the program constituting the software is installed from a program storing medium into, for example, a general-purpose personal computer or the like that is capable of implementing various functions by installing various programs.

As shown in FIG. 6, the recording medium includes the magnetic disk 46 (including a floppy disk), the optical disk 47 (including a compact disc-read only memory (CD-ROM) and a digital versatile disc (DVD)), the magneto-optical disc 48 (including a mini-disc (MD)), or a package medium constituted by the semiconductor memory 49 or the like in which the program has been recorded and which is distributed separately from a computer to a user to provide the program. The recording medium also includes a ROM or a hard disk or the like in which the program has been recorded and provided preinstalled in a computer.

In the specification, the steps for describing the program recorded in the recording medium include the steps of processing carried out in time series in the described sequence and also the steps of processing carried out in parallel or individually rather than in time series.

Thus, according to the image processing apparatus and method, and the program in a recording medium, a first conversion rule is generated by using a first element of an input image signal, and a second conversion rule is generated on the basis of the first conversion rule. By using the second conversion rule, a correction parameter for the first element of the input image signal is acquired, and a second element of the input image signal is corrected by using the correction parameter. With this arrangement, the occurrence of hue changes can be restrained.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An image processing apparatus for correcting the gray level of an image signal, comprising:

first generating means for generating a first conversion rule by using a first element of the image signal that has been input;

second generating means for generating a second conversion rule on the basis of the first conversion rule;

first correcting means for correcting the first element of the input image signal by using the first conversion rule;

acquiring means for acquiring a correction parameter associated with the first element of the input image signal by using the second conversion rule; and second correcting means for correcting a second element of the input image signal by using the correction parameter.

2. An image processing apparatus according to claim 1, wherein the first and second conversion rules are lookup tables.

3. An image processing apparatus according to claim 1, wherein the first element of the image signal is a luminance signal, and the second element of the image signal is a color-difference signal.

4. An image processing apparatus according to claim 1, wherein the first generating means comprises:

preparing means for preparing a histogram of the first element of the input image signal;

accumulating means for accumulating the histogram to prepare a cumulative histogram; and approximating means for approximating the cumulative histogram to a predetermined logarithmic curve thereby to generate the first conversion rule.

5. An image processing apparatus according to claim 1, wherein the second correcting means corrects the second element of the input image signal by multiplying the second element by the correction parameter.

6. An image processing apparatus according to claim 1, further comprising:

converting means for converting an optical signal of a subject into a color signal; and calculating means for calculating the first and second elements of the image signal on the basis of the color signal.

7. An image processing apparatus according to claim 6, wherein the converting means converts the optical signal of the subject into a red signal, a green signal, or a blue signal.

8. An image processing apparatus according to claim 6, wherein the converting means coverts the optical signal of the subject into a yellow signal, a cyan signal, or a green signal.

9. An image processing apparatus according to claim 6, wherein the converting means coverts the optical signal of the subject into a yellow signal, a cyan signal, a magenta signal, or a green signal.

10. An image processing method for an image processing apparatus for correcting the gray level of an image signal, the image processing method comprising:

a first generating step for generating a first conversion rule by using a first element of the image signal that has been input;

a second generating step for generating a second conversion rule on the basis of the first conversion rule;

a first correcting step for correcting the first element of the input image signal by using the first conversion rule;

an acquiring step for acquiring a correction parameter associated with the first element of the input image signal by using the second conversion rule; and a second correcting step for correcting a second element of the input image signal by using the correction parameter.

11. An image processing method according to claim 10, wherein the first and second conversion rules are lookup tables.

12. An image processing method according to claim 10, wherein the first element of the image signal is a luminance signal, and the second element of the image signal is a color-difference signal.

13. An image processing method according to claim 10, wherein the first generating step comprises:

a preparing step for preparing a histogram of the first element of the image signal that has been input;

an accumulating step for accumulating the histogram to prepare a cumulative histogram; and an approximating step for approximating the cumulative histogram to a predetermined logarithmic curve thereby to generate the first conversion rule.

14. An image processing method according to claim 10, wherein the second correcting step corrects the second element of the input image signal by multiplying the second element by the correction parameter.

15. An image processing method according to claim 10, further comprising:

a converting step for converting an optical signal of a subject into a color signal, and a calculating step for calculating the first and second elements of the image signal.

16. An image processing method according to claim 15, wherein the converting step converts the optical signal of the subject into a red signal, a green signal, or a blue signal.

17. An image processing method according to claim 15, wherein the converting step coverts the optical signal of the subject into a yellow signal, a cyan signal, or a green signal.

18. An image processing method according to claim 15, wherein the converting step coverts the optical signal of the subject into a yellow signal, a cyan signal, a magenta signal, or a green signal.

19. A recording medium in which a computer-readable image processing program for correcting the gray level of an image signal has been recorded, the program comprising:

a first generating step for generating a first conversion rule by using a first element of the image signal that has been input;

a second generating step for generating a second conversion rule on the basis of the first conversion rule;

a first correcting step for correcting the first element of the input image signal by using the first conversion rule;

an acquiring step for acquiring a correction parameter associated with the first element of the input image signal by using the second conversion rule; and a second correcting step for correcting a second element of the input image signal by using the correction parameter.

20. A recording medium, in which a computer-readable image processing program for correcting the gray level of an image signal has been recorded, according to claim 19, wherein the first and second conversion rules are lookup tables.

21. A recording medium, in which a computer-readable image processing program for correcting the gray level of an image signal has been recorded, according to claim 19, wherein the first element of the image signal is a luminance signal, and the second element of the image signal is a color-difference signal.

22. A recording medium, in which a computer-readable image processing program for correcting the gray level of an image signal has been recorded, according to claim 19, wherein the first generating step comprises:

a preparing step for preparing a histogram of the first element of the image signal that has been input;

an accumulating step for accumulating the histogram to prepare a cumulative histogram; and an approximating step for approximating the cumulative histogram to a predetermined logarithmic curve thereby to generate the first conversion rule.

23. A recording medium, in which a computer-readable image processing program for correcting the gray level of an image signal has been recorded, according to claim 19, wherein the second correcting step corrects the second element of the input image signal by multiplying the second element by the correction parameter.

24. A recording medium, in which a computer-readable image processing program for correcting the gray level of an image signal has been recorded, according to claim 19, further comprising:

a converting step for converting an optical signal of a subject into a color signal; and a calculating step for calculating the first and second elements of the image signal.

25. A recording medium, in which a computer-readable image processing program for correcting the gray level of an image signal has been recorded, according to claim 24, wherein the converting step converts the optical signal of the subject into a red signal, a green signal, or a blue signal.

26. A recording medium, in which a computer-readable image processing program for correcting the gray level of an image signal has been recorded, according to claim 24, wherein the converting step coverts the optical signal of the subject into a yellow signal, a cyan signal, or a green signal.

27. A recording medium, in which a computer-readable image processing program for correcting the gray level of an image signal has been recorded, according to claim 24, wherein the converting step coverts the optical signal of the subject into a yellow signal, a cyan signal, a magenta signal, or a green signal.

* * * * *